United States Patent Office 3,001,076
Patented Sept. 19, 1961

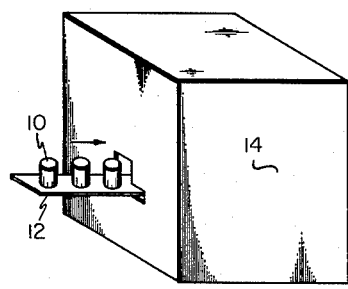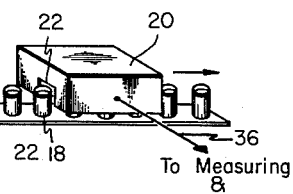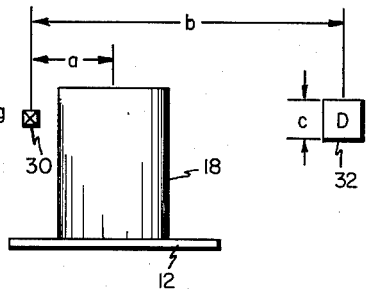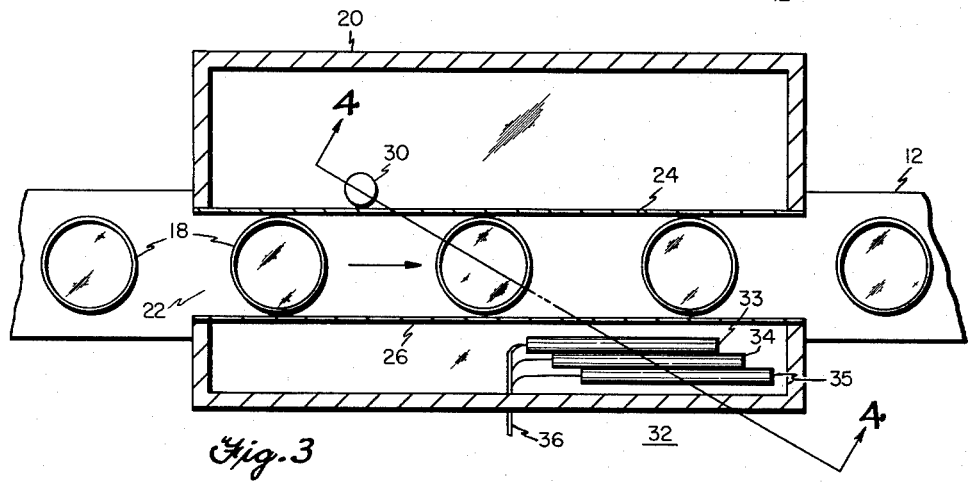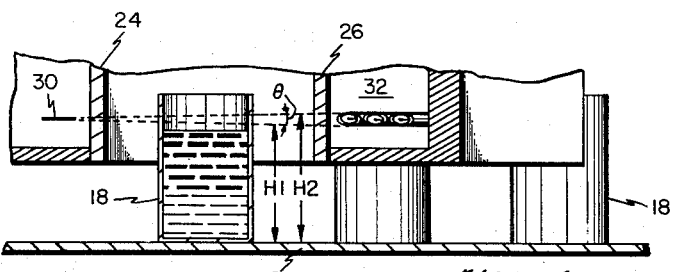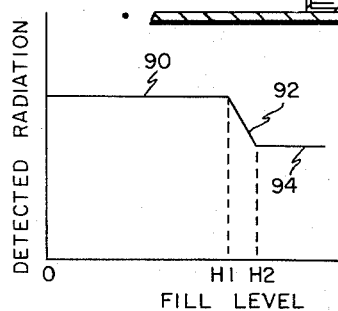

3,001,076
MEASURING SYSTEM
Jack G. Crump, Columbus, Ohio, assignor to Industrial Nucleonics Corporation, a corporation of Ohio
Filed Apr. 23, 1958, Ser. No. 730,347
9 Claims. (Cl. 250—83.6)

The present invention relates generally to nuclear gauging apparatus and more specifically to an improved method and means for accurately measuring the height of material deposited in containers.

Numerous companies presently package various types of goods in suitable containers before shipping to retail outlets for consumer sale. These consumer products may range from toothpaste in squeeze-tubes and bottled beverages to canned soups. A specified amount of goods is predetermined for each container and it is for obvious reasons in the economic interest of the packager to maintain this amount within limits in each container. In the interest of conserving considerable time and labor, the task of allotting a specified volume of material to empty containers has been almost universally assumed by automatic dispensing machinery. Automatic dispensing machines have been designed to fill various types of empty containers with a controllable volume of material and may assume any particular configuration adaptable to the nature of the material being dispensed. It is known that the amount or volume of material placed in a container is directly proportional to the height to which it is filled; therefore, to control a dispensing machine, that is, to accurately maintain this fill height, it is necessary to precisely measure the container fill height. In the systems heretofore known, fill level is ascertained through visual observation or through the utilization of X-ray inspection techniques. The former method requires human operators visually estimating the height to which containers are filled. Besides lacking the accuracy required for precise fill height control, this technique is not useable on opaque containers.

The X-ray method of fill height determination comprises a system in which an intense beam of X-rays is passed through the containers, at the desired fill height, toward a suitable detector usually a semiconductor material such as cadmium or mercury sulphide. This inspection device merely determines whether or not the containers are filled to the desired height. Although an X-ray system may be utilized in a process where underfilled or overfilled containers are rejected from the assembly line, the information is not adaptable to a fill height control system.

The resolution of a nuclear radiation detecting apparatus, operative to measure the fill height of containers, is defined as its ability to respond to slight changes in container fill height. If such a measuring apparatus is incorporated into a control loop where fine regulation of container fill height is required, it must possess excellent resolution, since it will be necessary to detect very minute changes in fill level.

Generally, the resolving power of a beam of radiation is dependent upon the solid angle of radiation subtended at the detector. The smaller this solid radiation angle becomes, the higher the degree of resolution obtainable. This means that there will be a large measurable change in detected radiation for a relatively small change in the fill height of the containers. In prior art arrangements, such as the aforementioned X-ray method, the desired system resolution was realized by reducing the physical size of the detector element. It will be apparent that due to the small detector a substantial source of radiation must be utilized in order to provide a measurable signal.

The present invention provides a radiation detecting apparatus capable of excellent resolution. A novel geometrical arrangement of a source of radiation and a detector for said radiation is utilized to reduce the solid angle of radiation between source and detector. A thin layer of radioactive material emits radiation from its small edge toward an ulteriorly disposed detector. The source-detector geometry as taught by the present invention thus affords a substantial plane of radiation between the source and detector.

Accordingly, it is a primary object of the present invention to provide a radiation detection system for a fill height process having a higher degree of resolution than devices used heretofore.

Another object of the present invention is to provide a new and improved geometrical configuration of a radiation source and detector for a fill height process.

It is another object of the present invention to provide a radiation source and detector configuration for a fill height process requiring a substantially smaller source of radiation than devices used heretofore.

It is an additional object of the present invention to provide a radiation source and detector configuration requiring substantially less shielding to minimize the health hazard attendant to external radiation.

It is still a further object of the present invention to provide a radiation source and detector configuration which is easily and readily adaptable to existing commercial dispensing processes.

The foregoing objects as well as numerous other advantages and features of the present invention will become more apparent when reference is taken to the subsequent specification including the drawings, in which:

FIG. 1 is an isometric illustration of a preferred embodiment of the present invention;

FIG. 2 is a simplified diagrammatic illustration of the effect upon system resolution of container position relative to a radiation source;

FIG. 3 is a horizontal sectional view of the detection unit shown in FIG. 1;

FIG. 4 is a sectional view taken on the line 3—3 of FIG. 2; and

FIG. 5 is a graph illustrating the detector response of the present invention.

Referring to the drawings and specifically to FIG. 1, there is shown a dispensing process wherein a plurality of empty containers 10 are transported by a continuous conveyor 12 through a dispensing machine 14. The dispenser 14 may be any type commercially available to deliver a controllable volume of material to the containers 10. Filled containers 18 are transferred in the direction indicated by the arrow to the vicinity of a fill height detection unit 20. A channel 22 extending the length of the detection unit 20 accommodates the passage of containers 18. A transmission line 36 may serve to couple the detection unit 20 to a gauge-controller (not shown) which may be operative to regulate the dispenser 14. For an interpretation of such a control system, reference may be had to a copending application Serial Number 730,472 for Measuring and Controlling System, filed April 23, 1958 by Robert A. Knapp and Jack G. Crump.

The detection unit 20 provides over line 36 a signal indicative of the fill height of containers 18. The detection unit 20 provides to the measuring circuits over line 36 a signal indicative of the fill height of containers 18. Referring to FIG. 2, a nuclear source of radiation 30 and a radiation detector 32 may be arranged as hereinafter described on opposite sides of the container 18 to provide this signal. The relative distances between the radiation source 30 and the container 18 is denoted as $a$ and the distance between the source 30 and the detector 32 denoted as $b$, whereas $c$ denotes the thickness of detector 32. Container 18 and material placed therein comprises a radiation absorbing medium between the source 30 and detector 32 which varies in accordance with the amount of material in container 18. The radiation from the source 30 is therefore modified by the absorber before striking the detector 32. Various container fill heights produce a changing radiation field in the vicinity of the detector 32.

Generally, the resolution of such a system is defined as the relationship of a change in observed radiation to a given change in container fill height. Resolution is a function of the distances $a$, $b$ and $c$. There are three alternative principles which may be used to improve the system resolution: (1) the distance $a$ can be reduced to a minimum value; (2) the distance $b$ can be increased, or (3) $c$ can also be reduced. The size of the detector 32 cannot be substantially reduced without incurring a decrease in signal-to-noise ratio. Likewise, since radiation intensity decreases as the square of the distance from the source 30, it is desirable to keep the distance $b$ reasonably small. The distance $a$ can be easily minimized by mounting the source 30 as close as possible to the containers 18.

It should be noted that there is a substantial difference between the distances $a$ and $b$. Thus, a small change in absorber attenuates a significant portion of the solid angle of radiation subtended by the detector 32. In this manner, a small change in the fill height of container 18 will cause a relatively large change in observed radiation at the detector 32. It should be apparent that the change in radiation is also dependent upon the mass of absorber, the level of radiation energy used, as well as numerous other variables familiar to those skilled in the art.

The principles described above are applied to the construction of the detector unit 20 of which FIG. 3 is a sectional view. FIG. 3 is formed by passing a plane parallel to the conveyor 12 through the midsection of the detector unit 20. The generally rectangular detection unit 20 preferably constructed of metallic material such as stainless steel is divided into two distinct compartments by sidewalls 24 and 26 of the channel 62. In one of these compartments, near an input side of the detection unit 20, is mounted the radiation source 30 enclosed by suitable shutter and shielding apparatus which are omitted for purposes of clarity. The radiation source 30 is placed as close as physically possible to the sidewall 24 on the other side of which pass the partially filled containers 18. In this manner, the source 30 is minimally separated from the containers 18 so that a change in container fill height will effect a profound change in the radiation flux field.

In order to intercept the attenuated radiation issuing from the source 30 and passing through the containers 18, the detector 32 is mounted at the output side of the detection unit 20 behind the sidewall 26. Although the detector 32 may be an ionization chamber or other voltage generator responsive to nuclear radiation, the preferred embodiment comprises three Geiger-Mueller tubes 33, 34 and 35 placed side by side, having parallel connected outputs coupled to line 36. The longitudinal axes of the three G-M tubes are arranged parallel to the direction of travel of the containers 18 and the tubes are staggered in accordance with their diagonal displacement as described hereinafter. The use of a plurality of G-M tubes is advantageous in the present embodiment since a substantial total wall area is provided for reaction with the radiation transmitted by the source 30. A larger signal-to-noise ratio will be realized over that provided by a single G-M tube.

The source 30 and detector 32 are diagonally displaced with regard to the direction of travel of containers 18 so that the radiation flux of source 30 is continuously being modified by the radiation absorbent containers 18. Since the containers 18 are commonly spaced approximately the diameter of one container apart, the angle of diagonal displacement may approach $\pi/6$ radians. Since the full intensity of radiation never strikes the detector 32, the problems brought about by pulsing of the G-M tubes are thereby eliminated. It should be noted that in certain applications it may be more desirable to arrange the G-M tubes 33, 34 and 35 and radiation source 30 perpendicular to the pass line.

The relative vertical relationships of source 30, detector 32 and containers 18 may be easily understood by referring now to the sectional view of FIG. 4. An extremely thin layer of radioactive material comprises the source 30 which bears a coplanar relation with the G-M tubes 33, 34 and 35. It should also be noted that this plane is likewise arranged parallel to the conveyor 12. Thus, only the radiation transmitted from the minimum dimension of source 30 is capable of striking the G-M tubes 33, 34 and 35. The Greek letter $\theta$ denotes this small solid angle of radiation subtended by the G-M tubes 33, 34 and 35. Heights H1 and H2 measured perpendicular to the conveyor 12 are defined as the respective lower and upper limits of container fill level between which it is possible to detect a change in radiation level at the G-M tubes 33, 34 and 35.

Several methods may be employed to provide the thin source of radiation 30. Through mechanical means, it is presently possible to manufacture cylindrically shaped pellets of radioactive material whose diameters are less than 0.040 inch. Another method of obtaining a thin source of radiation is that of drawing a fine wire of material such as elemental cobalt which is then activated and radiated to form the radioactive isotope. This method produces a "line" source of radiation whose thickness corresponds to the nominal diameter of the finely drawn wire, viz., 0.010 inch.

However, it has been found possible in the preferred embodiment to achieve excellent system resolution by utilizing a radiation source 30 comprising a layer of radioactive material whose thickness approaches zero. A layer of a radioisotope such as cesium-137 having a nominal thickness of 0.0001 inch may be deposited on a flat plane by an evaporation process. Although it is conceivable by means of this process to produce a radioactive film as thin as a single molecule of cesium-137, other factors influence the optimum thickness. These factors are the specific activity and the self-absorbing characteristics of the radioisotope. Since radiation intensity decreases as the square of the distance from the source, the strength of source 30 must be sufficient to provide substantial radiation energy in the vicinity of the ulteriorly disposed G-M tubes 33, 34 and 35.

Whereas the thickness of the radiation source 30 approaches zero and the thickness of the detector 32 is made as small as practical, it may be observed that the resolving power of the resultant beam of radiation will be quite great. Since the solid angle of radiation $\theta$ approaches zero and the source 30 closely adjoins the containers 18, the difference between the limits of distinguishable fill level H1 and H2 will be so slight that even a minute change in fill level, between these limits, will result in a large change in detected radiation level.

With reference now to FIG. 5, detected radiation is graphically plotted against fill level. FIG. 5 affords a most perspicuous illustration of the response of the G-M tubes 33, 34 and 35 to the fill level of containers 18. The amount of detected radiation remains quite high at 90 for values of fill level below height H1 as very little radiation will be absorbed by the container 18. Conversely, the amount of detected radiation will remain quite low at 94 if containers 18 are filled to levels exceeding height H2. However, the sloping segment 92 illustrates that there will be a measurable change in detected radiation for a variation in container fill height between the heights H1 and H2. Further, it may be observed that, with the present invention, due to the magnitude of the slope of segment 92, there will be a sizeable change in detected radiation for a relatively small change in fill level.

While a preferred embodiment of the present invention

What is claimed is:

1. A measuring system for determining the fill height of units successively being processed, comprising: means for conveying said units being processed through said measuring system, a source of radiation positioned immediately adjacent said conveyor means and at a height above said means determined by the optimum fill height of said units; a detector circuit, said detector circuit comprising a plurality of individually operative detectors each having an elongated configuration, said detectors having their longitudinal axes in parallel coplanar relationship with one another and parallel to said line of travel of said units, means for positioning said detectors on the opposite side of said conveyor from said source and at a height above said conveyor means to restrict the radiation detected from said source to that attenuated by said units at said optimum fill height, utilization means and means connecting in parallel the outputs of said detectors to said utilization means.

2. A source-detector unit substantially as set forth in claim 1 wherein said plurality of detectors are diagonally displaced from said source with regard to the direction of travel of said units, the angle of said displacement determined by the size of said units and the spacing therebetween to provide a continuous absorber between said source and said container.

3. A source-detector unit substantially as set forth in claim 1 wherein said plurality of elongated detectors are staggered in accordance with their diagonal displacement from said source.

4. A source-detector unit substantially as set forth in claim 1 wherein said plurality of detector each consists of a Geiger-Mueller tube.

5. A measuring system for determining the fill height of units successively being processed, comprising; means for conveying said units being processed through said measuring system, a source of radiation positioned immediately adjacent said conveyor means and at a height above said means determined by the optimum fill height of said units, said source comprising radioactive material having a minimum dimension directed toward and in a line with said optimum fill height to limit the penetrative radiation through said units to that emanating from said minimum dimension; a detector, means oppositely positioning said detector with respect to said source and said conveyor and at a height above said conveyor to restrict the radiation detected from said source to that emanating from said minimum dimension and attenuated by said units at said optimum fill height, means for utilizing the output of said detectors.

6. A source-detector unit substantially as set forth in claim 5 wherein said minimum dimension of said source approaches zero.

7. A source-detector unit substantially as set forth in claim 5 wherein said minimum dimension is in the order of .0001 inch.

8. A source-detector unit substantially as set forth in claim 5 wherein said source of radiation further comprises a flat layer of radioactive material and wherein said flat portion is in a plane that is coplanar with said fill height to limit the penetrative radiation through said units to that emanating from the outer edge of the flat layer.

9. A measuring system for determining the fill heights of units successively being processed, comprising; means for conveying said units through the measuring system, a source of radiation positioned immediately adjacent said conveyor means and at a height above said means determined by the optimum fill height of said units, said source comprising radioactive material having a minimum dimension in a plane that is coplanar with said fill height to limit the penetrative radiation through said units to that emanating from said minimum dimension; a detector circuit comprising a plurality of individually operative detectors each having an elongated configuration, said detectors having their longitudinal axes in parallel coplanar relationship with one another and parallel to said line of travel of said units, means for positioning said detectors on the opposite side of said conveyor from said source and at a height above said conveyor to restrict the radiation detected from said source to that emanating from said minimum dimension of said source and attenuated by said units at said optimum fill height; utilization means, and means for connecting the outputs of said detectors to said utilization means.

References Cited in the file of this patent

UNITED STATES PATENTS

| | | |
|---|---|---|
| 2,613,326 | Herzog | Oct. 7, 1952 |
| 2,708,721 | Ziffer | May 17, 1955 |
| 2,732,503 | Jacobs | Jan. 24, 1956 |
| 2,737,592 | Ohmart | Mar. 6, 1956 |
| 2,763,790 | Ohmart | Sept. 18, 1956 |
| 2,765,410 | Herzog | Oct. 2, 1956 |
| 2,830,190 | Karp | Apr. 8, 1958 |
| 2,870,341 | Pennock | Jan. 20, 1959 |
| 2,877,352 | Weigel | Mar. 10, 1959 |